United States Patent [19]
Orr

[11] 3,952,127
[45] Apr. 20, 1976

[54] EXTRUSION OF PLASTICS NETTING

[75] Inventor: Brian Orr, Preston, England

[73] Assignee: Netlon Limited, England

[22] Filed: Feb. 12, 1975

[21] Appl. No.: 549,145

Related U.S. Application Data

[63] Continuation of Ser. No. 312,757, Dec. 6, 1972, abandoned.

[30] Foreign Application Priority Data

Dec. 7, 1971 United Kingdom............... 56788/71

[52] U.S. Cl.................................. 428/255; 156/167; 156/180; 264/DIG. 81; 264/167; 425/382 N; 428/257

[51] Int. Cl.²........................................ D04G 1/00

[58] Field of Search............. 264/DIG. 81, 103, 167, 264/177, 210; 156/166, 167, 180, 181, 229; 428/137, 255, 107, 108, 112; 425/382 N

[56] References Cited
UNITED STATES PATENTS

| | | | |
|---|---|---|---|
| 3,312,766 | 4/1967 | Stevens | 264/167 |
| 3,331,725 | 7/1967 | Piercer | 267/167 |

FOREIGN PATENTS OR APPLICATIONS

| | | |
|---|---|---|
| 836,555 | 6/1960 | United Kingdom |

Primary Examiner—George F. Lesmes
Assistant Examiner—James J. Bell

[57] ABSTRACT

An extruded integral plastics net structure comprising first sets of spaced parallel strands, second sets of spaced parallel strands extending transversely thereto, the sets of strands being joined together at all or certain of their points of intersection to form a net structure wherein the intersection points along any one strand are in the alternating forms of any two of the following: (a) integral masses of mirror image symmetry about the median plane of the net, (b) assymetrical junctions in which there is substantially only linear contact and adhesion between the strands and (c) symmetrical junctions having only linear contact with little or no adhesion between the strands.

2 Claims, 18 Drawing Figures

KEY:

$\dfrac{\underset{3}{\overset{A}{\square}}}{A} = \bullet$, $\dfrac{\underset{3}{\overset{A}{\circ}}}{B} = \circ$, $\dfrac{\underset{3}{\overset{B}{\square}}}{A} = \square$, $\dfrac{\underset{3}{\overset{B}{\circ}}}{B} = +$

EXTRUSION OF PLASTICS NETTING

This is a continuation of application Ser. No. 312,757 filed Dec. 6, 1972, now abandoned.

This invention relates to extruded plastics net structures and means for producing the same, more particularly by apparatus of the character described in British Pat. No. 836555 which discloses a plastics net extrusion head comprising a pair of circular concentric, relatively rotatable, die members each having a circumferentially extending series of spaced net strand extrusion orifices.

Among the objects of the present invention are:

i. reduction of the resin content while maintaining dimensional stability in the network, ii. improved tensile strength in the net after orientation by stretching by permitting orientation of certain of the strands uniformly throughout their length, iii. improved structural behaviour of the net under impact stresses by permitting greater deflection of the strands under load, iv. provision of a wide variety of net structures to suit various end uses, v. greater control of the strength of a pre-selectable proportion of the joint structures from a very weak joint (or no actual joint) where required to joints which will not disassociate under orientation stretching or reasonable impact stresses, vi. fine mesh structures can be produced while maintaining a maximum bearing surface area between the inner and outer die members, vii. reduction of head pressure fluctuations in the plastics feed thus resulting in a more uniform strand structure, and viii. an increase in the range of practical resins for dies having closed bore strand extrusion orifices.

The invention consists in an extruded integral plastics net structure comprising first sets of spaced parallel strands, second sets of spaced parallel strands extending transversely thereto, the sets of strands being joined together at all or certain of their points of intersection to form a net structure wherein the intersection points along any one strand are in the alternating forms of any two of the following: (a) integral masses of mirror image symmetry about the median plane of the net, (b) assymetrical junctions in which there is substantially only linear contact and adhesion between the strands and (c) symmetrical junctions having only linear contact with little or no adhesion between the strands.

Where net, as set out above, is subjected to orientation by stretching in known manner, certain of the strands of each set of strands having form (b) and form (c) junctions will be orientated uniformly or substantially uniformly throughout their length even where they cross other strands thereby increasing the tensile strength of the structure whereas those strands including along their lengths junctions of form (a) will provide cohesion and dimensional stability for the structure.

The invention further consists in an extruded integral plastics net structure having first and second sets of parallel strands extending transversely to one another and the intersection forms (a), (b) and (c) as set out above wherein each "strand" of each set is a dual strand comprising two closely spaced strands so that each "strand" intersection comprises four intersection points one of form (a), two of form (b) and one of form (c), forms (a) and (c) being opposite. Such a structure has tensile strength after orientation due to the uniform stretching of the strands through the form (b) and form (c) intersections of each group and dimensional stability and cohesion of the form (a) intersection in each group.

Known techniques of extruding plastics net (i.e. the extrusion of an integral network the strands of which are joined without knotting include the employment of relatively rotating circular concentric die members having net strand extrusion orifices exclusively in the form of open slots (or partial slots), hereinafter referred to as slots, cut in the co-operating bearing surfaces between the inner and outer die members or having net strand extrusion orifices exclusively in the form of closed bores, hereinafter referred to as bores, extending from the pressurised plastics supply to the die face and spaced from the co-operating bearing surfaces between the inner and outer die members.

The intersection form (a) referred to above results from the passing opposition of two slots, form (b) above results from the passing opposition of a slot and, for example, a bore and form (c) above results from the passing operation of, for example, two bores.

The present invention consists in the arrangement of an alternating sequence of open slot net extrusion orifices and closed bore net extrusion orifices in both the inner and outer die members whereby the resultant net structure contains three different basic types of net intersection or strand crossing points, viz. those produced during the passing opposition of two open slots, those produced during the passing opposition, of for example, two closed bores and those produced during the passing opposition of an open slot and for example a closed bore.

The invention further consists in means for extruding an integral plastics net comprising reservoir means adapted to contain a plastics material under pressure, a pair of circular concentric, relatively rotating inner and outer die members having co-operating circular bearing surfaces, the inner and outer die members having a plurality of circumferentially spaced plastics extrusion die means extending therethrough from the reservoir means to the die faces, wherein the die means in each die member comprise circumferentially extending series of open slots formed in the die member bearing surface and closed bores extending from the reservoir means and emerging on the die face closely adjacent the die member bearing surface, the slots and bores alternating singly or in groups or both.

The grouping, spacing and dimension of the slots and/or bores may be varied according to the characteristics of the net intersection and the net product desired, as can be the speed of relative movement of the inner and outer dies.

In the accompanying drawings, which are all diagrammatic:

FIG. 1 shows an underside view of known circular concentric net extrusion dies having extrusion orifices in the form of slots, FIG. 2 is a cross-section on the line 2—2 of FIG. 1, FIG. 3 shows an underside view of known circular concentric net extrusion dies having extrusion orifices in the form of closed bores, FIG. 4 is a cross-section on the line 4–4 of FIG. 3, FIG. 5 shows an underside view of circular concentric net extrusion dies, having extrusion orifices according to the present invention in a form having a alternat- FIG. 6 is a cross-section on the line 6—6 of FIG. 5, FIGS. 7, 8 and 9 show variations of the series alternation of the slots and closed bores in each die, according to the present invention, and dies being shown as rectilinear for convenience, FIG. 10 shows alternating slots and closed bores, showing variations of dimension and spacing available according to the present invention.

Figure 1:
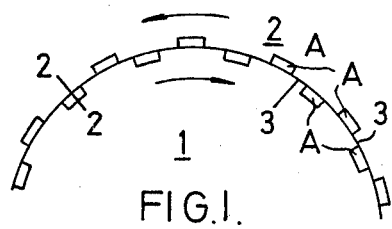
Figure 3:
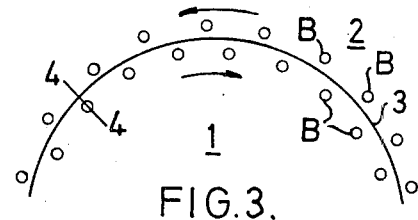
Figure 2:
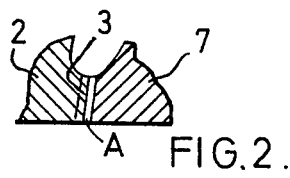
Figure 4:
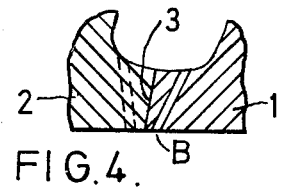

Apparatus for the extrusion of an integral plastic net in tubular form is known, for example, in the disclosure of the above mentioned British Patent. FIGS. 1 and 2 show a circular inner die member 1 and an annular outer die member 2 having a co-operating bearing surface 3 therebetween and each formed with strand extrusion slots A. Net has also been extruded by similar apparatus but with bores B forming the strand extrusion means in the inner and outer members 1 and 2 (see FIGS. 3 and 4).

Net structures produced from dies aving open slots A tend to have intersections which are bulky compared with the strand cross sectional areas, since when a pair of slots A come into register the friction factor on the plastics flow therethrough drops causing a transient "flooding" so that the resultant intersection is an integral mass. Net structures produced from dies having closed bores B have joints caused by the adhesion of the separately extruded strands and are not bulky nor are integrally extruded masses having, by contrast, a linear contact and adhesion where the two strands cross, this being a result of the fact that there is no flooding when bores B come into register.

Nets formed from open slots A have greater dimensional stability than nets formed from closed bores B, but it is far easier to molecularly orientate the strands from closed bores B, by stretching in known manner, so that orientation is substantially uniform along the length of each strand even through the joint.

Figure 5:
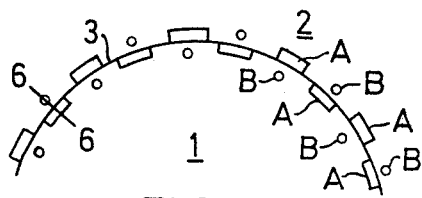
Figure 6:
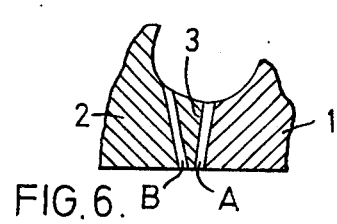

In a preferred form of carrying the invention into effect by way of example both open slots A and closed bores B are used in alternating sequence in both the inner and outer dies 1 and 2 (see FIGS. 5 and 6), whereby the resultant net has the advantage of both of the net structures referred to in the preceding paragraph, also the further advantage set out in the second paragraph of the present specification.

Figure 7:
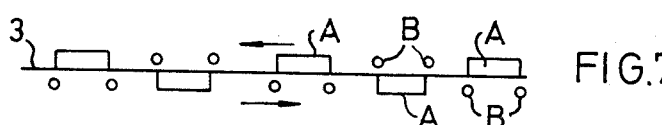
Figure 8:
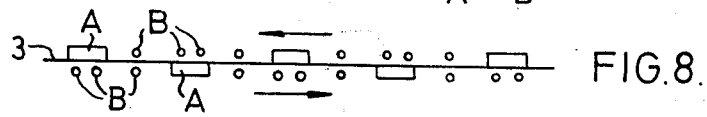
Figure 9:
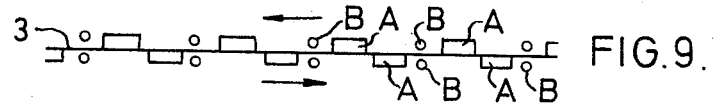

The invention is susceptible to a wide variety of embodiments within its scope and FIGS. 7, 8 and 9 show some sequential alernations of dies A and B, by way of example. In addition to sequence variation, the following factors may also be varied according to the net structure required:

Dies A — Depth — D
       Width — W
Dies B — Bore (diameter) — d
       — Spacing from die bearing surface 3 — $S^r$
Spacing between adjacent dies A and B — $S^c$
Relative velocity of die member rotation — VR.

Figure 11:
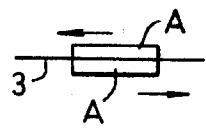
FIGS. 11 to 14 show the type of net strand intersection formed by the various combination of extrusion orifices as they pass one another during rotation of the dies and includes cross-sections of each intersection.
Figure 11:
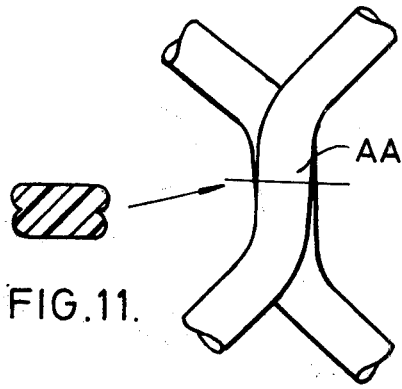
Figure 12:
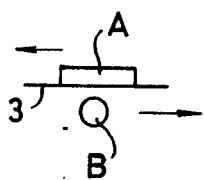
Figure 12:
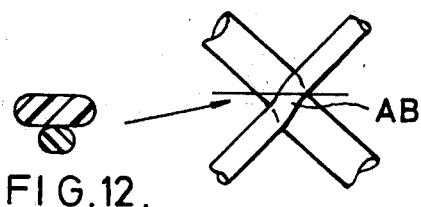
Figure 13:
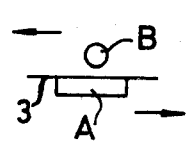
Figure 13:
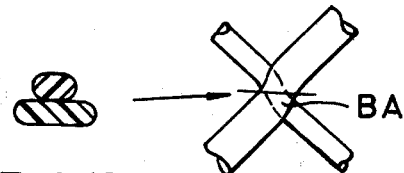
Figure 14:
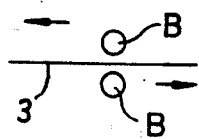
Figure 14:
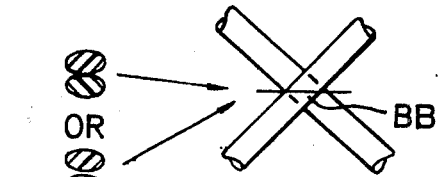

As mentioned above registration of a pair of dies A produce a bulky integral intersection AA (symmetrical junction), see FIG. 11; registration of a pair of dies B produce a non-integrally extruded intersection BB (symmetrical junction) having line contact and adhesion (or even no adhesion at all) see FIG. 14; the intersections formed by the registration of a die A and a die B (or a die B and a die A) are shown in FIGS. 12 and 13 as intersections AB or BA (asymmetrical junctions) and are stronger than the intersection BB shown in FIG. 14, but not as strong as the intersection AA shown in FIG. 11.

Figure 15:
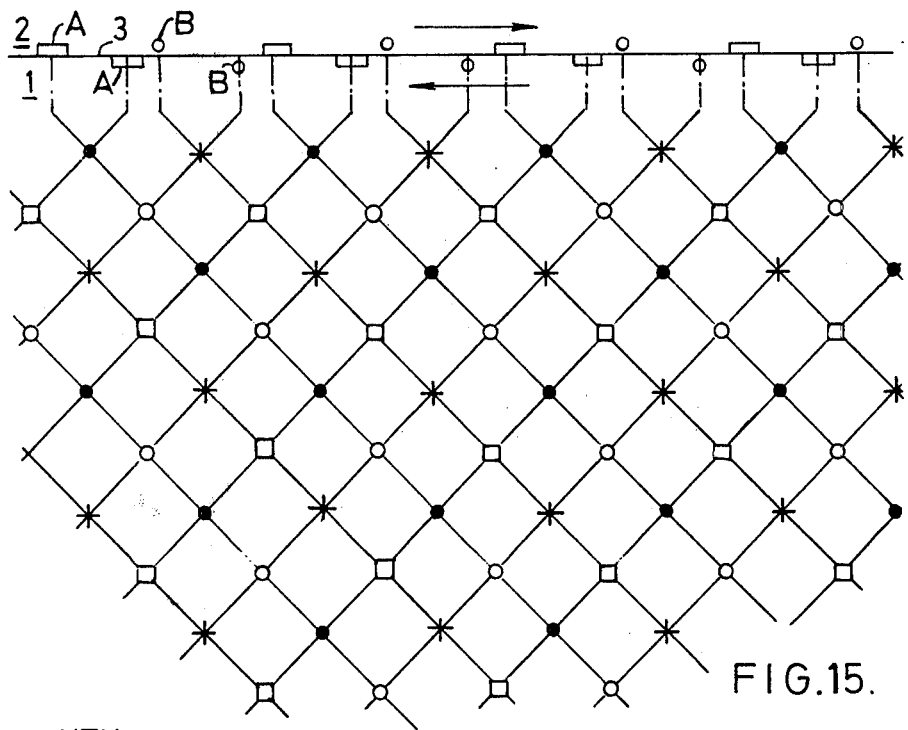
FIG. 15 shows the net form generated from a given sequence of alternating extrusion orifices with identification of each type of intersection.
Figure 16:
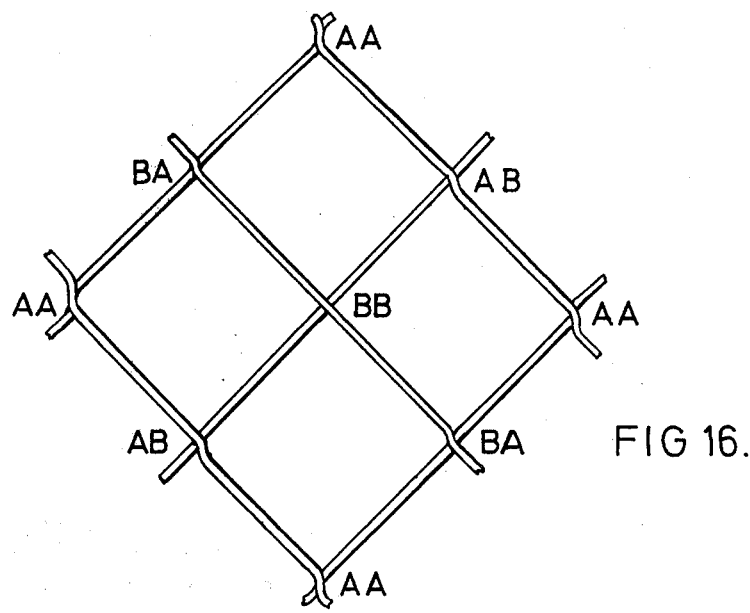
FIG. 16 shows a detail of the net form shown in FIG. 15.

FIG. 15 shows the net structure produced with the inner and outer dies 1 and 2 each having an alternating sequence of dies A - B - A - B - A etc. whereby each alternate strand sloping from left to right in the drawing has an intersection sequence of AA-AB-AA-AB etc. with the intervening parallel strands having the sequence BB-BA-BB-BA etc. The strands sloping from right to left have sequences AA-BA-AA-BA etc. and BB-AB-BB-AB etc. FIG. 16 shows this in greater detail.

The die A and B arrangement shown in FIGS. 7 and 8 will produce different sequences but on the same principle.

Figure 10:
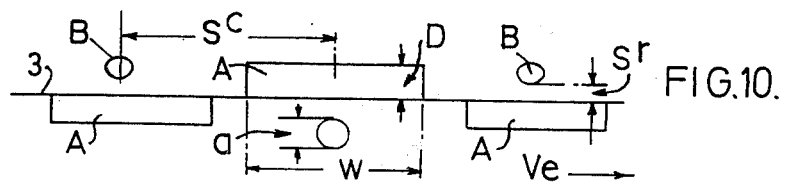
Figure 17:
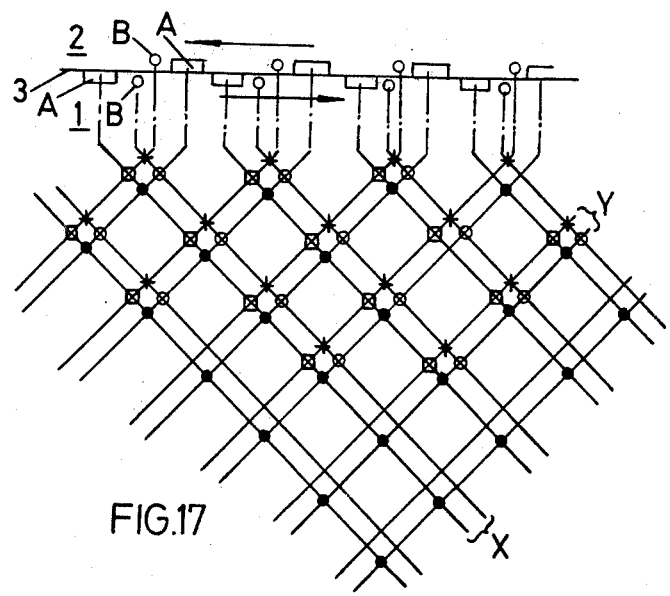
FIG. 17 shows a further net form generated from a modified arrangement of the alternating sequence of extrusion orifices shown in FIG. 15 and identifying each type of intersection and FIG. 18 shows on an enlarged scale the detail of the grouped intersections of differing types shown in FIG. 17.
Figure 18:
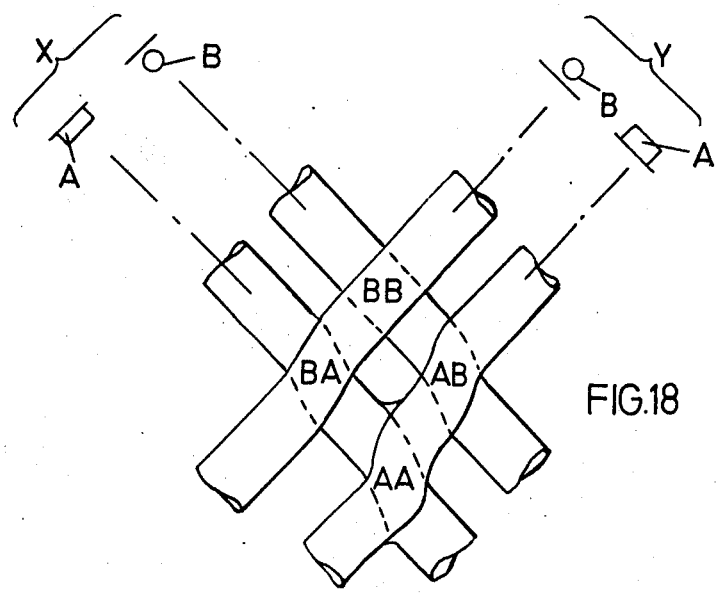

The die arrangement shown in FIG. 9 is shown again in FIG. 17 with the resultant net pattern in which the strands are in spaced groups X and Y of closely spaced strands. In FIGS. 17 (and FIG. 18) the spacing of the strands in each group X and Y has been shown as a distinct gap for the sake of clarity, but the spacing may be made so close (i.e. the spacing $S^c$, see FIG. 10) that the strands of each group will be contiguous or will coalesce and the intersections will tend to merge, although the junction BB, see FIG. 18, will usually be a non-adherent cross over as shown in the lower cross-section of FIG. 14.

While the dies B, i.e. closed bores, have been shown with a circular cross section as will usually be the case, they may be of other cross section e.g. rectangular formed by using a two-part die member 1 or 2 or other known bore-forming techniques.

I claim:

1. An extruded integral plastics net structure having mesh members comprising a first set of spaced parallel strands and a second set of spaced parallel strands extending transversely thereto, each set of strands comprising strands of dissimilar cross section, the sets of strands being joined together at at least some of their points of crossing to form a net structure wherein the crossing points along any one strand of the first set comprise (a) integral junction masses of mirror image symmetry about the median plane of the net intersections, and (b) asymmetrical junctions in which there is substantially only linear contact and adhesion between the strands and the crossing points along any of the strands of the second set comprise the latter form (b) and (c) symmetrical junctions having only linear contact and adhesion between the strands at crossings with no adhesion between the strands.

2. An extruded integral plastics net structure as claimed in claim 1, wherein each mesh member is a dual strand comprising two strands so that each mesh member crossing comprises four intersection points one of form (a), two of form (b) and one of form (c), forms (a) and (c) being diagonally opposite each other.

* * * * *